United States Patent [19]

Yang

[11] Patent Number: 5,003,418
[45] Date of Patent: Mar. 26, 1991

[54] REEL-DRIVING CLUTCH ASSEMBLY FOR A MAGNETIC RECORDING AND REPRODUCING APPARATUS

[75] Inventor: Hyung K. Yang, Seoul, Rep. of Korea

[73] Assignee: Goldstar Co., Ltd., Seoul, Rep. of Korea

[21] Appl. No.: 277,785

[22] Filed: Nov. 30, 1988

[30] Foreign Application Priority Data

Nov. 30, 1987 [KR] Rep. of Korea ............... 13554/1987

[51] Int. Cl.⁵ .............................................. G11B 5/008
[52] U.S. Cl. .................................... 360/96.4; 242/200
[58] Field of Search ..................... 360/96.3, 96.4, 96.1; 242/200, 201

[56] References Cited

U.S. PATENT DOCUMENTS

| | | | |
|---|---|---|---|
| 4,309,728 | 1/1982 | Takizawa et al. | 360/96.3 X |
| 4,680,659 | 7/1987 | Imai | 360/96.3 |
| 4,681,281 | 7/1987 | Aarts et al. | 360/96.3 X |
| 4,748,523 | 5/1988 | Aldenhoven et al. | 360/96.3 X |

FOREIGN PATENT DOCUMENTS

| | | | |
|---|---|---|---|
| 1012521 | 7/1957 | Fed. Rep. of Germany | 242/200 |
| 0003453 | 1/1987 | Japan | 360/96.3 |

*Primary Examiner*—Robert S. Tupper
*Assistant Examiner*—Andrew L. Sniezek
*Attorney, Agent, or Firm*—Birch, Stewart, Kolasch & Birch

[57] ABSTRACT

A reel-driving clutch assembly for a magnetic recording and reproducing apparatus comprises an intermediary gear and a belt pulley both having cylindrical extensions meshed each other through a recess and a slant surface provided with the intermediary and first and second protrusions provided with the belt pulley so that supply reel and a take-up reel are driven with suitable torques different each other in Play mode and Rev mode.

2 Claims, 2 Drawing Sheets

REEL-DRIVING CLUTCH ASSEMBLY FOR A MAGNETIC RECORDING AND REPRODUCING APPARATUS

BACKGROUND OF THE INVENTION

The present invention relates to a reel-driving clutch assembly for a magnetic recording and reproducing apparatus such as a video cassette tape recorder, and particularly to a reel-driving clutch assembly suitable for adapting a variation of torque in reel tables at the time of Play mode or Rev mode.

In a conventional video cassette tape recorder (hereinafter, referred to as a VCR), a rotary head drum is disposed at the rearward a supply reel and take-up reel, a capstan shaft and a pinch roller driven by the driving force of a capstan motor are mounted at the outlet side of tape on the rotary head drum and also mounted thereat is an audio control head. And at the inlet side of tape on the rotary head drum, a full erasing head, a tension control device for controlling a tension of tape, and a number of slant or vertical guide posts and rotatable guide rollers are respectively mounted.

In such a construction, since a tape travels with contacting the parts of the tape running system a load is generated in the tape due to the friction therebetween, and the tape in running toward the take-up reel or the supply reel has different loads each other depending upon the condition of installation of the parts.

Furthermore, since the various parts are disposed on a base plate of a deck dependently upon play mode, the larger power is required when the tape is wound up on the supply reel than when the tape is wound up on the take-up reel, as a result a higher torque is required on the supply reel at the time of Rev mode than the wound up torque required on the take-up reel at the time of play mode.

In a ½ inch VHS-type VCR, for example, the take-up reel needs a torque of about 150 g. cm in play mode, and the supply reel needs a torque of about 190 g. cm in Rev mode. Such difference of torques between the supply reel and the take-up reel are adapted not only to a VHS-type VCR but also to the majority of VCR having a contruction provided with a supply reel and take-up reel.

Therefore, a separate device is required for the purpose of making a torque of the supply reel large more than that of the take-up reel in a VCR.

Such a device is illustrated in FIG. 1, in which a take-up clutch gear 31 and a supply clutch gear 32 both having different clutch forces are respectively disposed and an idler gear 34 is also disposed in such a manner that it can transmit a driving force selectively to a supply reel 35 or a take-up reel 36 therebetween. And, in a type that a clutch gear is disposed between a supply reel 35 and a take-up reel 36 so that the supply reel 35 or the take-up reel 36 can be selectively driven by making use of a belt pulley 33, a reel-driving device, which can vary the torques of Play mode and Rev mode by making the diameter of the supply reel 35 is larger than that of the take-up reel 36, is also known.

In the conventional device as shown in FIG. 1, when a belt pulley 33 and a gear 33' rotates in the counterclockwise by the driving force of a capstan motor (not shown) via a belt 37 at the time of Rev mode, an idler gear 38 meshed with the gear 33' is rotated in the clockwise and an idler gear 34 connected with a lever 39 is swung in the counterclockwise centering around a shaft 40 so that it can mesh with a supply clutch gear 32, thereby a clutch force is transmitted to a supply reel 35 to generate the torque of Rev mode.

And, at the time of Play or Rev mode, the capstan shaft rotates in the reverse direction in contrast with the above so that the idler gear 34, is meshed with the take-up clutch gear 31, thereby a clutch force is transmitted to the take-up reel 36 to generate the torque of Play mode.

However, in such a conventional device, there has been some drawbacks in that since the respective clutches are necessary for the supply reel and the take-up reel in order to vary the torques between Rev mode and Play mode, thus giving rise to increasement of the cost due to its complicated structure.

SUMMARY OF THE INVENTION

Therefore, the primary object of the present invention is to provide a reel-driving clutch assembly which can drive the supply reel and take-up reel with a different torque each other at the time of Play mode and Rev mode.

In accordance with the present invention, this object of the present invention is accomplished by providing an intermediary gear having a cylindrical extension at the lower surface thereof, a belt pulley having a cylindrical extension at the upper surface thereof, said two extensions are provided with a recess and a slant surface, two step-shaped protrusions each of which are meshed with the recess and slant surface, a coil spring disposed between the intermediary gear and the belt pulley, and a felt attached to the upper surface of the intermediary gear so that the friction force by the felt and spring is controlled in accordance to the rotational direction of the belt pulley, thereby it is possible to drive the reels with the different torque each other at the time of Play mode and Rev mode.

DETAILED DESCRIPTION OF THE INVENTION

Figure 1:
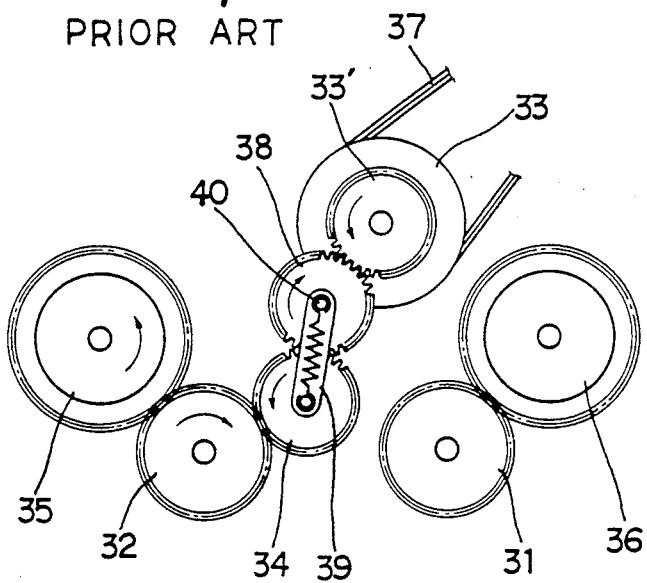
FIG. 1 is a plan view showing a conventional reel-driving system.

Referring to FIGS. 2 to 5, the reel-driving clutch assembly according to the present invention comprises a fixing shaft 2 fixed to a bracket 1, an output gear 3 having a cylindrical extension 10 at the center of the lower surface thereof and an intermediary gear 5 having a cylindrical extension 11 at the center of the lower surface thereof which are rotatably mounted to the fixing shaft 2, a felt 4 attached to the upper surface of the intermediary gear 5, a belt pulley 8 around which a belt 7 is wound, having a cylindrical extension 12 at the center of the upper surface thereof, a coil spring 6 disposed between the intermediary gear 5 and the pulley 8 so as to urge the intermediary gear 5 to contact with the output gear 3 through the intermediary of the felt 4, and a bushing 9 fixed to the lower end of the cylindrical extension 10 of the output gear 3. In the above construction, the extension 10 of the output gear 3 is inserted into the extensions 11 and 12 of the intermediary gear 5 and pulley 8, and at the lower end of the extension 11 of the intermediary gear 5, a recess 13 and a slant surface 14 are continuously formed. Furthermore, at the upper end of the extension 12 of the belt pulley 8, the first and second protrusions 15 and 16 are formed with a step-shaped so that the first protrusion 15 is inserted into the recess 13 of the extension 11 and the second protrusion 16 is located under the slant surface 14 of the extension 11, as shown in FIG. 5A.

In the drawing, the reference numeral 17 shows an idler arm secured to the upper end of the fixing shaft 2, and to an axial pin 18 fixed to one end of the idler arm 17. An idler gear 21 is rotatably mounted to transmit the power of the output gear 3 to the reels 19 or 20.

Hereinafter, the operation and effect of the present invention is described in detail.

Figure 2:
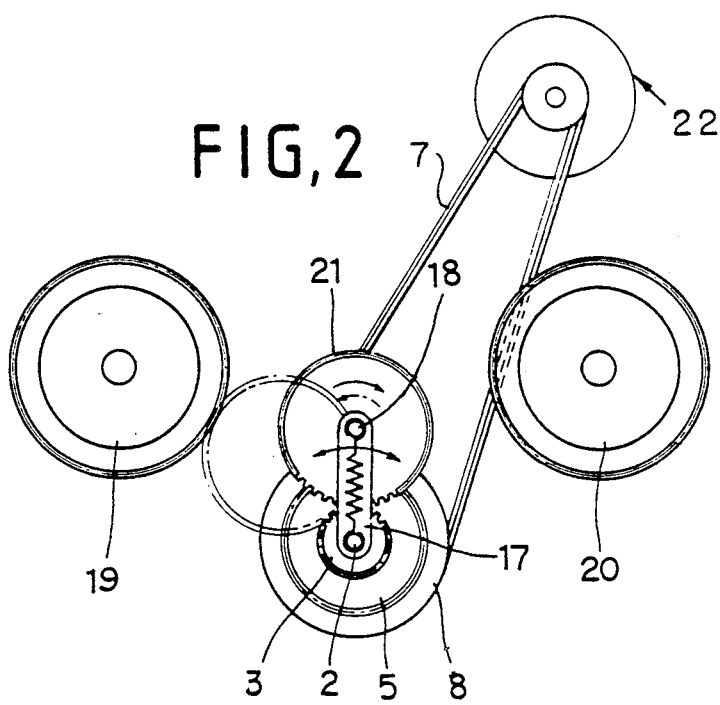
FIG. 2 is a plan view showing the reel-driving system according to the present invention.
Figure 3:
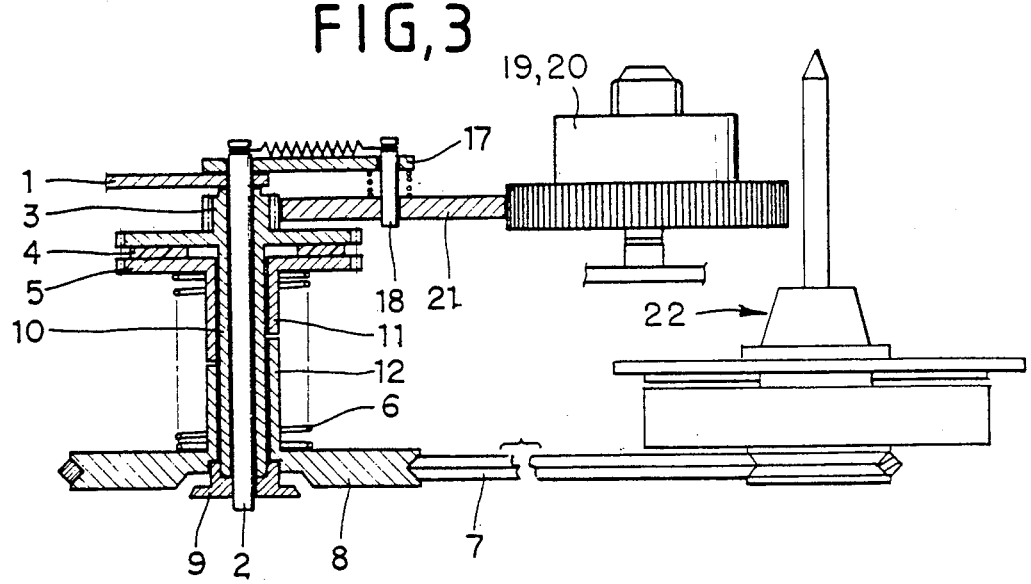
FIG. 3 is a cross sectional view showing the construction of the reel-driving clutch assembly according to the present invention.
Figure 4:
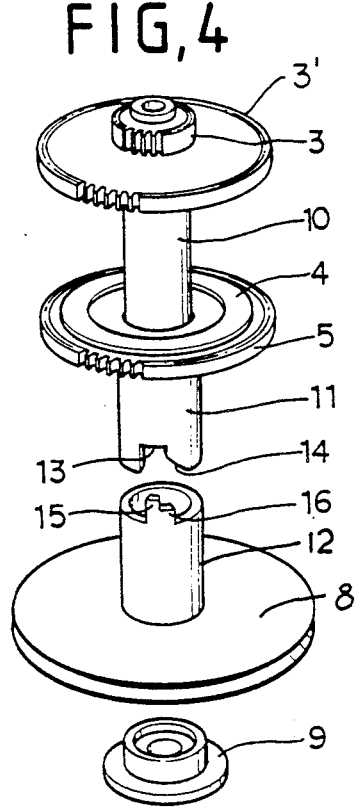
FIG. 4 is an exploded perspective view of the subject portion of the reel-driving clutch assembly of FIG. 3.

When the driving force of a capstan motor 22 is transmitted to the belt pulley 8 through the belt 7 and the pulley 8 is rotated in the clockwise direction as shown in FIG. 2, the first protrusion 15 of the cylindrical extension 12 is meshed with the recess 13 of the cylindrical extension 11 of the intermediary gear 5 and in accordance with the rotation of the intermediary gear 5 together with the pulley 8 in the clockwise direction, the idler arm 17 is also rotated in the clockwise direction centering around the fixing shaft 2 so that the idler gear 21 contacts with the take-up reel 20 to transmit the power thereto. At this moment, the torque transmitted to the take-up reel 20 is a friction clutch force that generated by pressing the felt 4 with the lower surface of the output gear 3 by means of the pressing force of the coil spring 6.

Figure 5A:
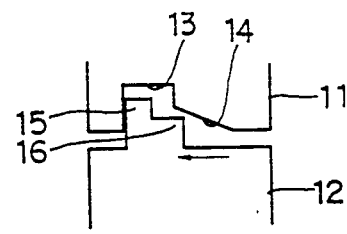
FIGS. 5A and 5B are explanatory view showing the function of the reel-driving clutch assembly of the present invention.
Figure 5B:
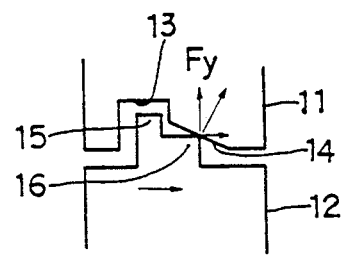

On the other hand, as the capstan motor 22 rotates in the reverse direction at the time of Rev mode, the pulley 8 is also rotated in the counterclockwise so that the idler gear 21 transmits the driving force to the supply reel 19, as shown in FIG. 5B. At this moment, the second protrusion 16 is contacted with the slant surface 14 of the cylindrical extension 11 of the intermediary gear 5, and in the course of the contacting of the second protrusion 16 and the slant surface 14, an opposing force is generated on the slant surface 14 by means of the rotation obstructing force of the friction clutch force by the coil spring 6. This opposing force, differently with play mode, has a vertical component force and a horizontal component force and it results in adding the vertical component force Fy to the pressing force of the coil spring 6 so that the friction clutch force is increased, thereby a larger torque than that play of mode is transmitted to the take-up reel 20.

As described hereinbefore, the present invention has some advantages that since only one mechanical clutch assembly is utilized to transmit a different torque to both reels in accordance to the rotational direction of the belt pulley, the assembly occupies minimum space and has a simple constructions, thereby reducing the cost and minimizing the whole apparatus.

What is claimed is:

1. A reel drive clutch assembly for a video cassette recorder, which comprises:
    a rotatable winding supply reel and a rotatable winding take-up reel disposed in said video cassette recorder,
    a belt pulley provided with a cylindrical extension attached at one end to an upper surface of said belt pulley for receiving a driving force of a capstan motor, said cylindrical extension having at its other end an end surface comprising a first protrusion and a second protrusion,
    an intermediary gear having a cylindrical extension attached at one end to a lower surface of said intermediary gear, said cylindrical extension of the intermediary gear having at its other end an end surface provided with a recess and a slant surface contacting the end surface of said cylindrical extension of said belt pulley,
    an output gear arrangement comprising a small output gear provided integrally on an upper surface of a large output gear and having a cylindrical extension attached to a lower surface of said large gear, said cylindrical extensions of said large gear being inserted into said cylindrical extensions of said belt pulley and said intermediary gear,
    a felt attached between the upper surface of said intermediary gear and the lower surface of said large gear,
    a coil spring disposed between said intermediary gear and said belt pulley,
    a bushing fixed to a lower portion of the cylindrical extension of said large gear,
    a shaft fixed to a bracket and inserted into the cylindrical extension of said large gear, and an idler gear meshed with said small output gear for selectively transmitting the driving force to said rotatable winding supply reel or said rotatable winding take-up reel in accordance with the direction of rotation of said capstan motor, whereby the supply and take-up reels are driven at different torques when a Play mode or a Rev mode of the video cassette recorder is actuated.

2. The reel driving clutch assembly according to claim 1, wherein the first protrusion is meshed with said recess and said second protrusion disposed below said slant surface.

* * * * *